United States Patent
Olofsson et al.

(10) Patent No.: US 9,124,511 B2
(45) Date of Patent: Sep. 1, 2015

(54) DETERMINING BACKUP FORWARDING PATHS BASED ON ROUTE DISTINGUISHER CORRELATION VALUES

(75) Inventors: Stefan Olofsson, Dubai (AE); Pradosh Mohapatra, Fremont, CA (US); Pranav Piyushbhai Mehta, San Jose, CA (US); Arjun Sreekantaiah, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 19 days.

(21) Appl. No.: 13/347,653

(22) Filed: Jan. 10, 2012

(65) Prior Publication Data

US 2013/0176845 A1     Jul. 11, 2013

(51) Int. Cl.
*H04L 12/707*     (2013.01)
*H04L 12/751*     (2013.01)
*H04L 12/715*     (2013.01)
*H04L 12/703*     (2013.01)
*H04L 12/721*     (2013.01)

(52) U.S. Cl.
CPC ............... *H04L 45/22* (2013.01); *H04L 45/02* (2013.01); *H04L 45/04* (2013.01); *H04L 45/28* (2013.01); *H04L 45/70* (2013.01)

(58) Field of Classification Search
CPC ... H04L 63/20; H04L 2463/101; H04L 29/06; H04L 69/329; H04L 2463/102; H04L 45/22; H04L 45/28; H04L 63/0428; H04L 2463/103; H04L 45/00; H04L 43/00; H04L 43/0811

USPC ......... 370/225, 401, 352, 254, 389, 392, 338; 709/223, 224, 238, 226, 220, 225

See application file for complete search history.

(56) References Cited

U.S. PATENT DOCUMENTS

| | | | |
|---|---|---|---|
| 7,852,772 | B2 | 12/2010 | Filsfils et al. |
| 7,916,729 | B2 | 3/2011 | Mohapatra et al. |
| 2002/0067725 | A1 | 6/2002 | Oguchi et al. |
| 2007/0091796 | A1* | 4/2007 | Filsfils et al. ............ 370/228 |
| 2010/0008220 | A1 | 1/2010 | Le Roux et al. |
| 2010/0034098 | A1 | 2/2010 | Wang et al. |
| 2011/0080911 | A1 | 4/2011 | Guichard et al. |

OTHER PUBLICATIONS

Uttaro et al. "Best Practices for Advertisement of Multiple Paths in BGP", Nov. 2010.*

(Continued)

*Primary Examiner* — Un C Cho
*Assistant Examiner* — Oussama Roudani
(74) *Attorney, Agent, or Firm* — The Law Office of Kirk D. Williams

(57) ABSTRACT

In one embodiment, a packet switching device determines backup forwarding paths based on route distinguisher correlation values. A route distinguisher correlation value is some value associated with multiple routes, which allows a packet switching device to consider routes associated with a same route distinguisher correlation value, but having different route distinguishers and a same prefix to be considered as going to a same destination. Examples of route distinguisher correlation value used in one embodiment include, but are not limited to: scalar values, a route distinguisher of a different route, a virtual private network associated with a different route; a route target associated with the a different route; or a Border Gateway Protocol (BGP) Next-hop address associated with a different route.

24 Claims, 6 Drawing Sheets

(56) References Cited

OTHER PUBLICATIONS

Rosen et al. "BGP-MPLS IP Virtual Private Networks (VPNs)", Feb. 2006.*
"I-AS MPLS Solutions", 2009. rfc4271, "A Border Gateway Protocol 4 (BGP-4)", Jan. 2006.*
Sangli et al. "BGP Extended Communities Attribute", Feb. 2006.
"Inter-Autonomous System", Dec. 2003.*
E. Rosen & Y. Rekhter, "BGP/MPLS IP Virtual Private Networks (VPNs)," RFC 4364, The Internet Society, Feb. 2006 (47 pages).
Marques et al., "Constrained Route Distribution for Border Gateway Protocol/MultiProtocol Label Switching (BGP/MPLS) Internet Protocol (IP) Virtual Private Networks (VPNs)," RFC 4684, The Internet Society, Nov. 2006 (14 pages).
Amendment B, U.S. Appl. No. 12/573,088, US Patent Office, Alexandria, VA, filed Jul. 26, 2012 (12 pages).
Amendment D, U.S. Appl. No. 12/573,088, US Patent Office, Alexandria, VA, filed Feb. 18, 2014 (15 pages).
Office action, U.S. Appl. No. 12/573,088 US Patent Office, Alexandria, VA, mailed Apr. 23, 2014 (32 pages).

* cited by examiner

DETERMINING BACKUP FORWARDING PATHS BASED ON ROUTE DISTINGUISHER CORRELATION VALUES

TECHNICAL FIELD

The present disclosure relates generally to routing packets by a packet switching device in a network, including distributing routing information and determining backup paths for primary paths through the network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Different techniques may be employed in a network to communicate packets in a network when the topology of the network changes, such as when a path over which certain packets are forwarded becomes unavailable.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
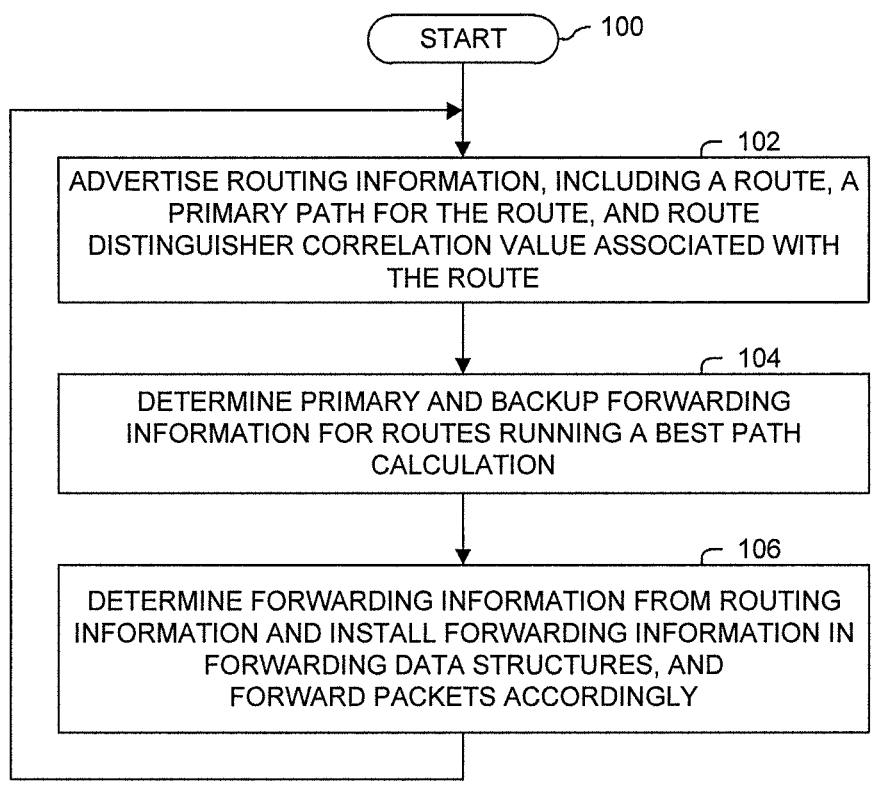
FIG. 1A illustrates a process according to one embodiment.

Disclosed are, inter alia, methods, apparatus, computer-storage media, mechanisms, and means associated with determining backup forwarding paths based on route distinguisher correlation values. In one embodiment, a route distinguisher correlation value is some value associated with multiple routes, which allows a packet switching device to consider routes associated with a same route distinguisher correlation value, but having different route distinguishers and a same prefix to be considered as going to a same destination. In one embodiment, a route distinguisher correlation value associated with a route is a route distinguisher of another route. In one embodiment, a route distinguisher correlation value associated with a route identifies a virtual private network associated with another route. In one embodiment, a route distinguisher correlation value associated with a route identifies a route target associated with the another route. In one embodiment, a route distinguisher correlation value associated with a route identifies a Border Gateway Protocol (BGP) Next-hop address associated with another route.

One embodiment includes: receiving, at a particular packet switching device, routing protocol advertisement information; wherein said routing protocol advertisement information includes: a first route, a first primary path and a route distinguisher correlation value, with the first primary path and the route distinguisher correlation value identified as being associated with the first route; and a second route, a second primary path and the route distinguisher correlation value, with the second primary path and the route distinguisher correlation value identified as being associated with the second route; wherein the first route includes a first route distinguisher and a particular prefix, and the second route includes a route distinguisher different than the first route distinguisher and the particular prefix; and determining a particular backup path from the particular packet switching device for the first route, which includes considering the first and second routes to refer to the same destination based on both the first route and the second route being associated with the route distinguisher correlation value; wherein the particular backup path includes the second primary path.

One embodiment includes installing the particular backup path in a forwarding data structure of the particular packet switching device for use in forwarding packets having a destination address corresponding to the first route in case of an unavailability of a particular primary path, including the first primary path, for the first route. One embodiment includes forwarding packets, by the particular packet switching device in response to an unavailability of the particular primary path, having a destination address corresponding to the first route over the particular backup path.

In one embodiment, the particular packet switching device is an autonomous system boundary router (ASBR). In one embodiment, the particular packet switching device is configured to advertise paths to other ASBR-nodes according to the Inter AS Option B model. In one embodiment, the route distinguisher correlation value is advertised in an extended Border Gateway Protocol (BGP) community as an attribute to the first route. In one embodiment, the route distinguisher correlation value is not advertised in an extended Border Gateway Protocol (BGP) community as an attribute to the second route.

In one embodiment, the route distinguisher correlation value is the same value as the route distinguisher of the second route. In one embodiment, the route distinguisher correlation value identifies the route distinguisher of the second route. In one embodiment, the route distinguisher correlation value identifies a virtual private network associated with the second route. In one embodiment, the route distinguisher correlation value identifies a route target associated with the second route. In one embodiment, the route distinguisher correlation value identifies a Border Gateway Protocol (BGP) Next-hop address associated with the second route.

2. Description

Disclosed are, inter alia, methods, apparatus, computer-storage media, mechanisms, and means associated with determining backup forwarding paths based on route distinguisher correlation values. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and nonlimiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with determining backup forwarding paths based on route distinguisher correlation values. In one embodiment, a route distinguisher correlation value is some value associated with multiple routes, which allows a packet switching device to consider routes associated with a same route distinguisher correlation value, but having different route distinguishers and a same prefix to be considered as going to a same destination. In one embodiment, a route distinguisher correlation value associated with a route is a route distinguisher of another route. In one embodiment, a route distinguisher correlation value associated with a route identifies a virtual private network associated with another route. In one embodiment, a route distinguisher correlation value associated with a route identifies a route target associated with the another route. In one embodiment, a route distinguisher correlation value associated with a route identifies a Border Gateway Protocol (BGP) Next-hop address associated with another route.

One embodiment includes: receiving, at a particular packet switching device, routing protocol advertisement information; wherein said routing protocol advertisement information includes: a first route, a first primary path and a route distinguisher correlation value, with the first primary path and the route distinguisher correlation value identified as being associated with the first route; and a second route, a second primary path and the route distinguisher correlation value, with the second primary path and the route distinguisher correlation value identified as being associated with the second route; wherein the first route includes a first route distinguisher and a particular prefix, and the second route includes a route distinguisher different than the first route distinguisher and the particular prefix; and determining a particular backup path from the particular packet switching device for the first route, which includes considering the first and second routes to refer to the same destination based on both the first route and the second route being associated with the route distinguisher correlation value; wherein the particular backup path includes the second primary path.

One embodiment includes installing the particular backup path in a forwarding data structure of the particular packet switching device for use in forwarding packets having a destination address corresponding to the first route in case of an unavailability of a particular primary path, including the first primary path, for the first route. One embodiment includes forwarding packets, by the particular packet switching device in response to an unavailability of the particular primary path, having a destination address corresponding to the first route over the particular backup path.

In one embodiment, the particular packet switching device is an autonomous system boundary router (ASBR). In one embodiment, the particular packet switching device is configured to advertise paths to other ASBR-nodes according to the Inter AS Option B model. In one embodiment, the route distinguisher correlation value is advertised in an extended Border Gateway Protocol (BGP) community as an attribute to the first route. In one embodiment, the route distinguisher correlation value is not advertised in an extended Border Gateway Protocol (BGP) community as an attribute to the second route.

In one embodiment, the route distinguisher correlation value is the same value as the route distinguisher of the second route. In one embodiment, the route distinguisher correlation value identifies the route distinguisher of the second route. In one embodiment, the route distinguisher correlation value identifies a virtual private network associated with the second route. In one embodiment, the route distinguisher correlation value identifies a route target associated with the second route. In one embodiment, the route distinguisher correlation value identifies a Border Gateway Protocol (BGP) Next-hop address associated with the second route.

One embodiment includes: receiving, at a particular packet switching device, routing protocol advertisement information including: a first route, a first primary path and a second route distinguisher, with the first primary path and the second route distinguisher identified as being associated with the first route; and a second route and a second primary path, with the second primary path identified as being associated with the second route; wherein the first route includes a first route distinguisher and a particular prefix, and the second route includes the second route distinguisher and the particular prefix; and based on the first route being associated with the second route distinguisher and the second route distinguisher of the second route being the same as the second route distinguisher: determining a particular backup path from the particular packet switching device for the first route, with the particular backup path including the second primary path.

One embodiment includes installing the particular backup path in a forwarding data structure of the particular packet switching device for use in forwarding packets having a destination address corresponding to the first route in case of an unavailability of a particular primary path, including the first primary path, for the first route. One embodiment includes forwarding packets, by the particular packet switching device in response to an unavailability of the particular primary path, having a destination address corresponding to the first route over the particular backup path. In one embodiment, the particular packet switching device is an autonomous system boundary router (ASBR). In one embodiment, the particular packet switching device is configured to advertise paths to other ASBR-nodes according to the Inter AS Option B model. In one embodiment, said routing protocol advertisement information includes a same route target associated with both the first route and the second route; and wherein said determining the particular backup path is further based on the same route target associated with both the first route and the second route.

In one embodiment, said routing protocol advertisement information of the first route, the first primary path and the second route distinguisher, with the first primary path and the second route distinguisher identified as being associated with the first route is originated by a first packet switching device which determined a backup path for the first route, with the backup path being associated with the second route from which the second route distinguisher was extracted and included in said routing protocol advertisement information by the first packet switching device. In one embodiment, said routing protocol advertisement information of the first route, the first primary path and the second route distinguisher, with the first primary path and the second route distinguisher identified as being associated with the first route, is advertised with the second route distinguisher being carried in an extended Border Gateway Protocol (BGP) community as an attribute to the first route.

One embodiment includes: receiving, at a particular packet switching device, routing information including: first routing information originated by a first packet switching device, and second routing information originated by a second packet switching device; wherein said first routing information includes: a first route associated with a first primary path and with a second route distinguisher of a backup path for the first route; wherein said second routing information includes a second route associated with a second primary path; and wherein the first route includes the first route distinguisher and a particular prefix, and the second route includes the second route distinguisher and the particular prefix; and determining, by the particular packet switching device based on the second route distinguisher received in the first routing protocol advertisement being the same as the second route distinguisher of the second route, a particular backup path for the first route, with the particular backup path including the second primary path.

One embodiment includes installing the particular backup path in a forwarding data structure of the particular packet switching device for use in forwarding packets associated with a destination address of the first route in case of an unavailability of a particular primary path, including the first primary path, for the first route. One embodiment includes forwarding particular packets associated with a destination address of the first route over the particular backup path instead of the particular primary path in response to an unavailability of the particular primary path. In one embodiment, the particular packet switching device is an autonomous system boundary router (ASBR). In one embodiment, the first packet switching device is a provider edge device and the second packet switching device is a provider edge device. In one embodiment, each of said first routing information and said second routing information includes an identification of a same route target. In one embodiment, the second route distinguisher is carried in an extended Border Gateway Protocol (BGP) community as an attribute to the first route in the first routing information. In one embodiment, said second routing information includes an identification that the second route is associated with the first route distinguisher; and wherein the method comprises: determining, by the particular packet switching device based on the first route distinguisher received in the first routing protocol advertisement being the same as the second route distinguisher of the second route, a particular backup path for the second route, with the particular backup path including the first primary path. In one embodiment, the second route distinguisher is carried in an extended Border Gateway Protocol (BGP) community as an attribute to the first route in the first routing information.

One embodiment includes: determining, by a particular packet switching device, a primary route for a particular first route, with the particular first route including a first route distinguisher and a particular prefix; and advertising, to one or more other packet switching devices in one or more routing protocol advertisement messages, the particular first route being associated with the primary route and a route distinguisher correlation value One embodiment includes: determining, by a particular packet switching device, a primary route and a backup route for a particular first route, with the particular first route including a first route distinguisher and a particular prefix, and the second route including a second route distinguisher and the particular prefix; and advertising, to one or more other packet switching devices in one or more routing protocol advertisement messages, the particular first route being associated with the primary route and the second route distinguisher.

One embodiment includes a particular packet switching device, comprising: a plurality of interfaces configured to send and receive packets; memory; and one or more processing elements. In one embodiment, the packet switching device is configured to: receive routing information, which includes: first routing information originated by a first packet switching device, and second routing information originated by a second packet switching device; wherein said first routing information includes: a first route associated with a first primary path and a route distinguisher correlation value; wherein said second routing information includes a second route associated with a second primary path and the route distinguisher correlation value; and wherein the first route and the second route both include a same particular prefix but have different route distinguishers; determine a particular backup path for the first route, which includes considering the first and second routes to refer to a same destination based on both the first route and the second route being associated with the route distinguisher correlation value, and wherein the particular backup path includes the second primary path; install the particular backup path in a forwarding data structure of the particular packet switching device for use in forwarding packets associated with a destination address of the first route in case of an unavailability of a particular primary path, including the first primary path, for the first route; and forward particular packets associated with a destination address of the first route over the particular backup path instead of the particular primary path in response to an unavailability of the particular primary path.

One embodiment includes a particular packet switching device, comprising: a plurality of interfaces configured to send and receive packets; memory; and one or more processing elements. In one embodiment, the packet switching device is configured to: receive routing information, which includes: first routing information originated by a first packet switching device, and second routing information originated by a second packet switching device; wherein said first routing information includes: a first route associated with a first primary path and with a second route distinguisher of a backup path for the first route; wherein said second routing information includes a second route associated with a second primary path; and wherein the first route includes the first route distinguisher and a particular prefix, and the second route includes the second route distinguisher and the particular prefix; determine a particular backup path for the first route, which includes considering the first and second routes to refer to a same destination based on the second route distinguisher received in the first routing protocol advertisement being the same as the second route distinguisher of the second route, and wherein the particular backup path includes the second primary path; install the particular backup path in a forwarding data structure of the particular packet switching device for use in forwarding packets associated with a destination address of the first route in case of an unavailability of a particular primary path, including the first primary path, for the first route; and forward particular packets associated with a destination address of the first route over the particular backup path instead of the particular primary path in response to an unavailability of the particular primary path.

Expressly turning to the figures, FIG. 1A illustrates a process performed in one embodiment by a packet switching device. Processing begins with process block 100. In process block 102, routing information is advertised by a packet switching device. This routing information includes a route, a primary path for the route, and a route distinguisher correlation value associated with the route. In process block 104, from the received routing information, the packet switching device determines primary and backup forwarding information for each of the routes by running a best-path process. In process block 106, forwarding information is determined and installed in forwarding data structures, and packets are forwarded accordingly. Processing returns to process block 102 to illustrate that the process illustrated in FIG. 1A is typically an iterative process adapting to changes in a corresponding network.

Figure 1B:
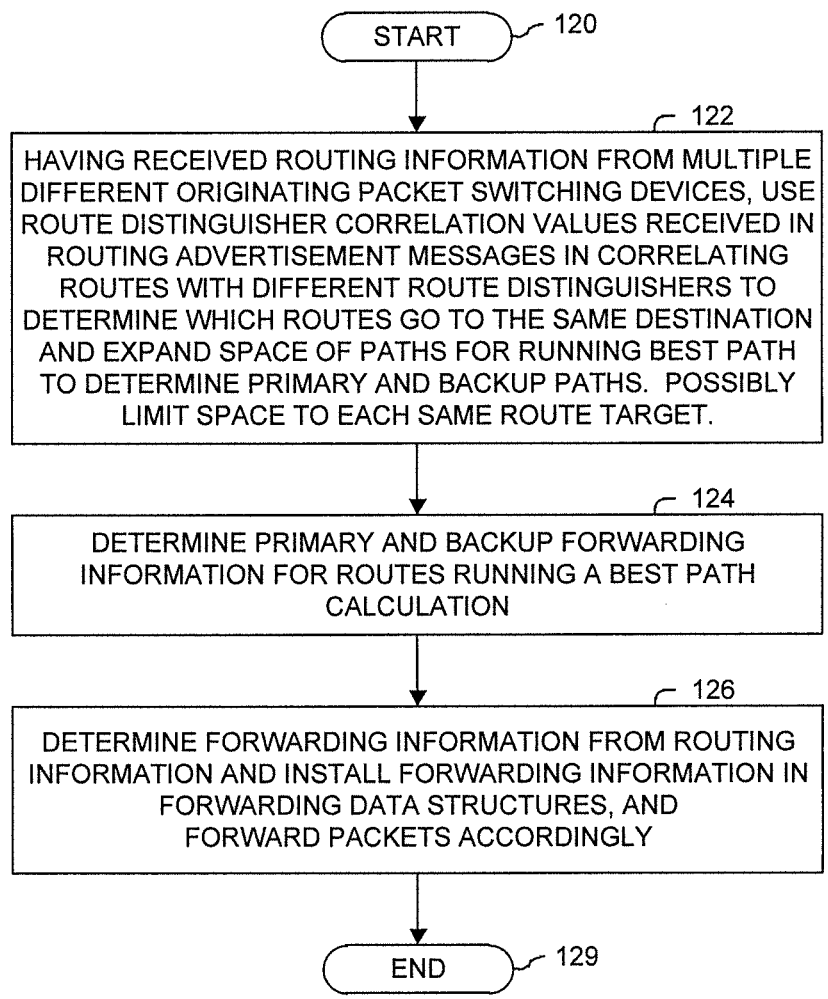
FIG. 1B illustrates a process according to one embodiment.

FIG. 1B illustrates a process performed in one embodiment. In one embodiment, the process of FIG. 1B is included in the process of FIG. 1A of one or more packet switching devices.

Processing of the flow diagram of FIG. 1B begins with process block 120. In process block 122, the packet switching device, having received routing information from multiple different originating packet switching devices, correlates routes associated with a same route distinguisher correlation value to determine which routes go to the same destination. A route distinguisher correlation value is some value associated with multiple routes, which allows a packet switching device to consider routes associated with a same route distinguisher correlation value, but having different route distinguishers and a same prefix to be considered as going to a same destination. Thus, the space of paths to a same destination is expanded for running a best path calculation to determine primary and backup paths to this destination (even though the routes to the same destination might be different as they might have different route distinguishers).

In process block 124, the primary and backup forwarding information is determined for routes, typically by performing a best path calculation. In process block 126, forwarding information is determined and installed in forwarding data structures, and packets are forwarded accordingly. Processing of the flow diagram of FIG. 1B is complete as indicated by process block 129.

Figure 2A:
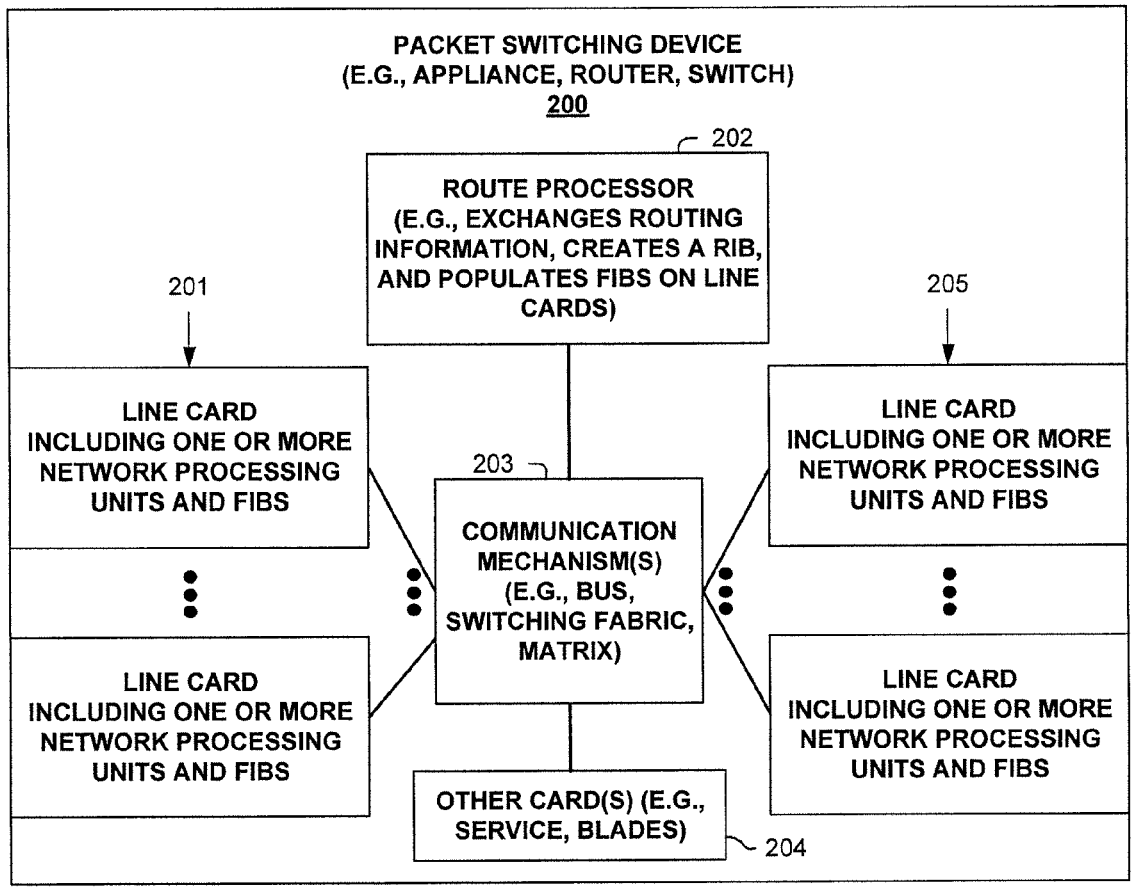
FIG. 2A illustrates a packet switching device according to one embodiment.

One embodiment of packet switching device 200 (e.g., appliance, router, switch bridge) is illustrated in FIG. 2A. As shown, packet switching device 200 includes line cards 201 and 205, each with one or more network processing units and FIBs for use in forwarding packets. Additionally, packet switching device 200 also has a route processor 202, which typically manages the control plane by communicating routing information with other packet switching devices, populates one or more RIBs, and populates one or more FIBs in line cards 201 and 205.

In one embodiment, route processor 202 performs route correlation based on route distinguisher correlation values to identify routes having a same prefix, but different route distinguisher, to be considered as going to a same destination for route calculation and/or other purposes.

Packet switching device 200 also includes other cards 204 (e.g., service cards, blades), and some communication mechanism 203 (e.g., bus, switching fabric, matrix) for allowing its different entities 201, 202, 204 and 205 to communicate.

Note, as used herein, a network processing unit refers to a network processor and memory for use in processing (e.g., including forwarding) of packets. A line card can have a single network processing unit, or may have multiple network processing units.

Figure 2B:
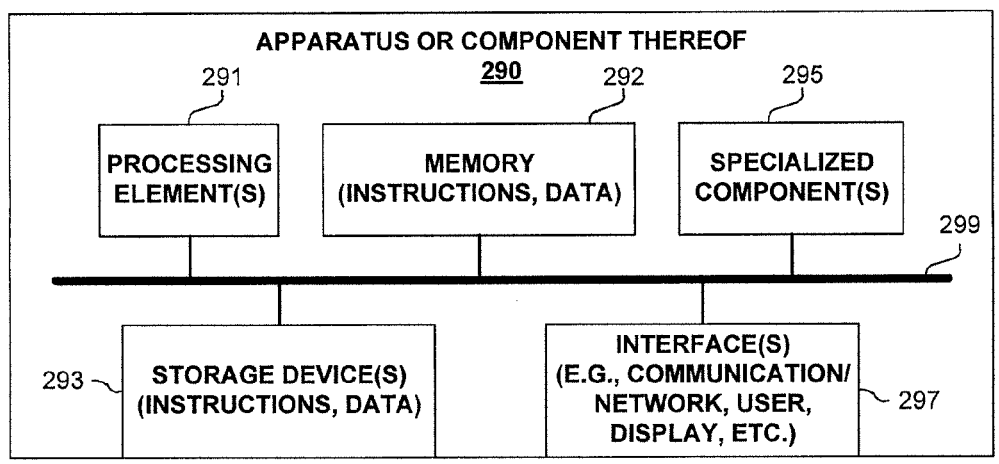
FIG. 2B illustrates an apparatus or component configured to operate, and/or operating, according to one embodiment.

FIG. 2B is a block diagram of an apparatus or component 290 used in one embodiment associated with determining backup forwarding paths based on route distinguisher correlation values. In one embodiment, apparatus or component 290 performs one or more processes corresponding to one of the flow diagrams illustrated or otherwise described herein, and/or illustrated in another diagram or otherwise described herein.

In one embodiment, apparatus or component 290 includes one or more processing element(s) 291, memory 292, storage device(s) 293, specialized component(s) 295 (e.g. optimized hardware such as for performing operations, etc.), and interface(s) 297 for communicating information (e.g., sending and receiving packets, user-interfaces, displaying information, etc.), which are typically communicatively coupled via one or more communications mechanisms 299, with the communications paths typically tailored to meet the needs of a particular application. In one embodiment apparatus or component 290 corresponds to, or is part of, packet switching device 200 of FIG. 2A.

Various embodiments of apparatus or component 290 may include more or fewer elements. The operation of apparatus or component 290 is typically controlled by processing element(s) 291 using memory 292 and storage device(s) 293 to perform one or more tasks or processes. Memory 292 is one type of computer-readable/computer-storage medium, and typically comprises random access memory (RAM), read only memory (ROM), flash memory, integrated circuits, and/or other memory components. Memory 292 typically stores computer-executable instructions to be executed by processing element(s) 291 and/or data which is manipulated by processing element(s) 291 for implementing functionality in accordance with an embodiment. Storage device(s) 293 are another type of computer-readable medium, and typically comprise solid state storage media, disk drives, diskettes, networked services, tape drives, and other storage devices. Storage device(s) 293 typically store computer-executable instructions to be executed by processing element(s) 291 and/or data which is manipulated by processing element(s) 291 for implementing functionality in accordance with an embodiment.

A route distinguisher correlation value is some value associated with multiple routes, which allows a packet switching device to consider routes associated with a same route distinguisher correlation value, but having different route distinguishers and a same prefix to be considered as going to a same destination. Examples of route distinguisher correlation value used in one embodiment include, but are not limited to: scalar values, a route distinguisher of a different route, a virtual private network associated with a different route; a route target associated with the a different route; or a Border Gateway Protocol (BGP) Next-hop address associated with a different route. For purposes of example, FIGS. 3, 4A and 4B will describe the use of a route distinguisher correlation value that is a route distinguisher of another route, with teachings applicable to other route distinguisher correlation values.

Figure 3:
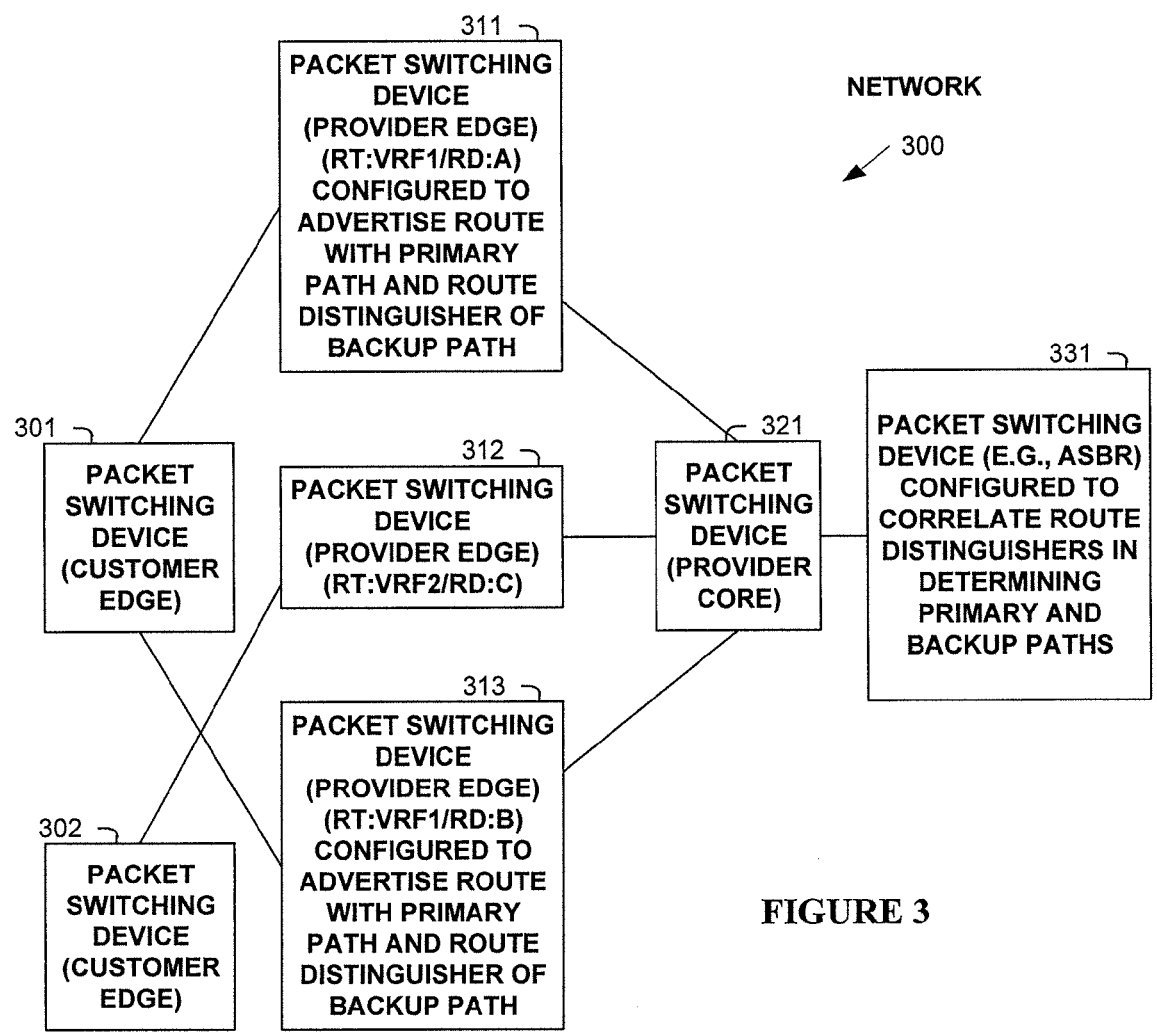
FIG. 3 illustrates a network according to one embodiment.

FIG. 3 illustrates the operation of one embodiment using a network 300, which includes packet switching devices 301-331. In one embodiment, packet switching devices 301 and 302 are a customer edge devices; packet switching devices 311-313 are provider edge devices; packet switching device 321 is a provider core device; and packet switching device 331 is an Autonomous System Boundary Router (ASBR). In one embodiment, packet switching device 331 advertises paths to other ASBR-nodes according to the Inter AS Option B model.

Of course, various embodiments are used in different networks (e.g., especially more complex networks); and network 300 simply provides one context in which one embodiment is used.

Illustrated in network 300 is the use of two different local area networks (LANs), with those being a first LAN corresponding to a route target (RT) of VRF1 configured in packet switching devices 311 and 313) and a second LAN corresponding to a route target (RT) of VRF2 (configured in packet switching devices 302 and 312). Each of packet switching devices 311 and 312 is configured to use a route distinguisher (RD) "A", with packet switching device 313 configured to use route distinguisher "B". A route target is a way of associating a virtual private network (VPN) with a VPN routing or forwarding instance (VRF), which includes the routing information for the VPN. Thus, routing information exchanged in a network can be identified as to which VPN it pertains, and thus, packet switching devices can logically separate and operate on independent VPNs.

A route distinguisher is a value added to a prefix/network address (e.g., to an Internet Protocol address) to make the route (e.g., the route target prepended to the prefix/network address) unique in a VRF/network. For example, multiple customers may use a same IP address, which by a network provider associating a different RD with each, makes each of these IP addresses unique. Route distinguishers can also be used to generate two different routes (e.g., route distinguisher prepended to a prefix/network address) unique within a same network to a same destination. Routing processes will view them as different routes. This enables routing processes to be able to associate a different path with each of these different routes (e.g., different RDs with a same prefix/network address), thus, providing a mechanism to forward packets over different paths through a network to a same destination. For example, one path could be installed in a forwarding data structure as a primary path with a different one installed as a backup path for performing fast rerouting of packets in response to a network failure.

However, certain packet switching devices, such as ASBR packet switching device 331 in network 300 are not VRF aware, and therefore, do not previously have the ability to determine both such primary and backup paths.

In one embodiment, packet switching devices 301-331 exchange routing information using a routing protocol, such as, but not limited to Border Gateway Protocol (e.g., including, but not limited to, internal BGP/iBGP).

At least each of packet switching devices 311 and 313 will determine (and typically install) primary and backup paths to packet switching device 301 for each of one or more routes. Additionally, each of packet switching devices 311 and 313 will originate the advertisement of these routes (e.g., RD and prefix/network address) and its primary path, as well as the RD of its backup path.

For example, packet switching device 311 will originate an advertisement of route (RD:A, prefix-1) with a path directly to packet switching device 301 (as this is the best path in this example), and a RD of B of the backup path [as the backup path to packet switching device 301 is through packet switching device 313, with a corresponding route of (RD:B, prefix-1)]. In this example, packet switching device 313 originates an advertisement of route (RD:B, prefix-1) with a path directly to packet switching device 301 (as this is the best path in this example), and a RD of A of the backup path [as the backup path to packet switching device 301 is through packet switching device 311, with a corresponding route of (RD:A, prefix-1)]. In one embodiment, each of these advertisements include a route target (RT) of VRF1.

Packet switching device (e.g., ASBR) 331 will receive these two route advertisement messages. Packet switching device 331 can then correlate the RD of the backup path of one advertisement with the RD of the route of another advertisement to establish that the routes of both advertisement messages are routes going to the same destination. That is, the two routes have the same prefix/network address (prefix-1 in our example), and different RD's (RD:A of one route which is the advertised RD of the backup path of the other route, and RD:B of one route which is the advertised RD of the backup path of the other route). Packet switching device 331 can then calculate its best path on a set of paths including both paths for the two routes (or more routes in a larger network), and from which, determine a primary path and a backup path for reaching the same destination. Packet switching device 331 then installs these primary and backup paths in a forwarding data structure, with the backup path available to forward packets over the backup path instead of the primary path in response to the primary path becoming unavailable (e.g., in response to a failure in network 300).

As alluded to supra, in one embodiment, more than two routes with a same prefix and different RD's may be received by packet switching device 331, which correlates these routes based on corresponding RD's of backup paths advertised with the primary path, and then performs the best path calculation thereon, in determining a corresponding primary and backup path.

In one embodiment, packet switching device 331 uses route targets (RTs) advertised in the routing protocol to provide contexts for identifying which routes should be correlated together as described herein (e.g., correlate those with the same advertised RT).

In one embodiment, another packet switching device 301-313 performs the calculation as described herein for determining primary and backup paths to another packet switching device for routes advertised with the RT of their backup path.

Figure 4A:
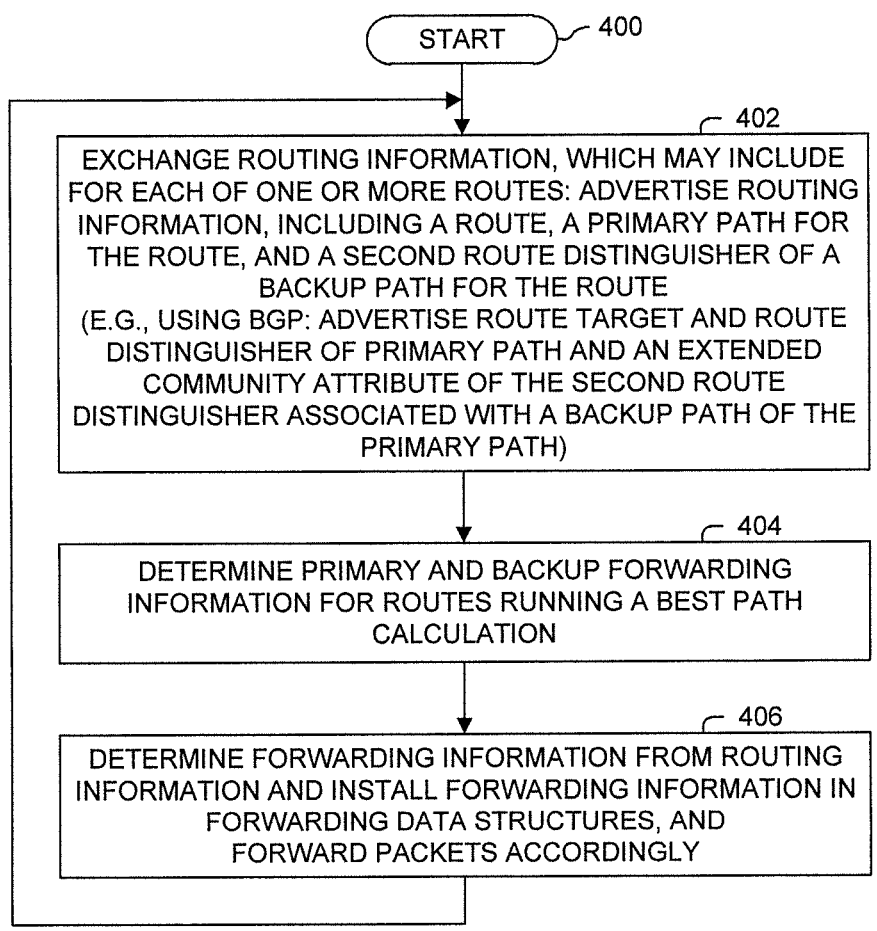
FIG. 4A illustrates a process according to one embodiment.

FIG. 4A illustrates a process performed in one embodiment. Processing begins with process block 400. In process block 402, routing information is exchanged for one or more routes. In one embodiment, this route advertisement includes advertising a route, a primary path for the route, and a second route distinguisher of a backup path for the route as determined by the originating packet switching device. In one embodiment, the route target of the originating packet switching device is also advertised as being associated with the route. In one embodiment, a BGP extended community attribute is used to advertise the association of a route with a route distinguisher of a backup path of the route as determined by the originating packet switching device. In process block 404, from the received routing information, the packet switching device determines primary and backup forwarding information for each of the routes by running a best-path process. In process block 406, forwarding information is determined and installed in forwarding data structures, and packets are forwarded accordingly. Processing returns to process block 402 to illustrate that the process illustrated in FIG. 4A is typically an iterative process adapting to changes in a corresponding network.

Figure 4B:
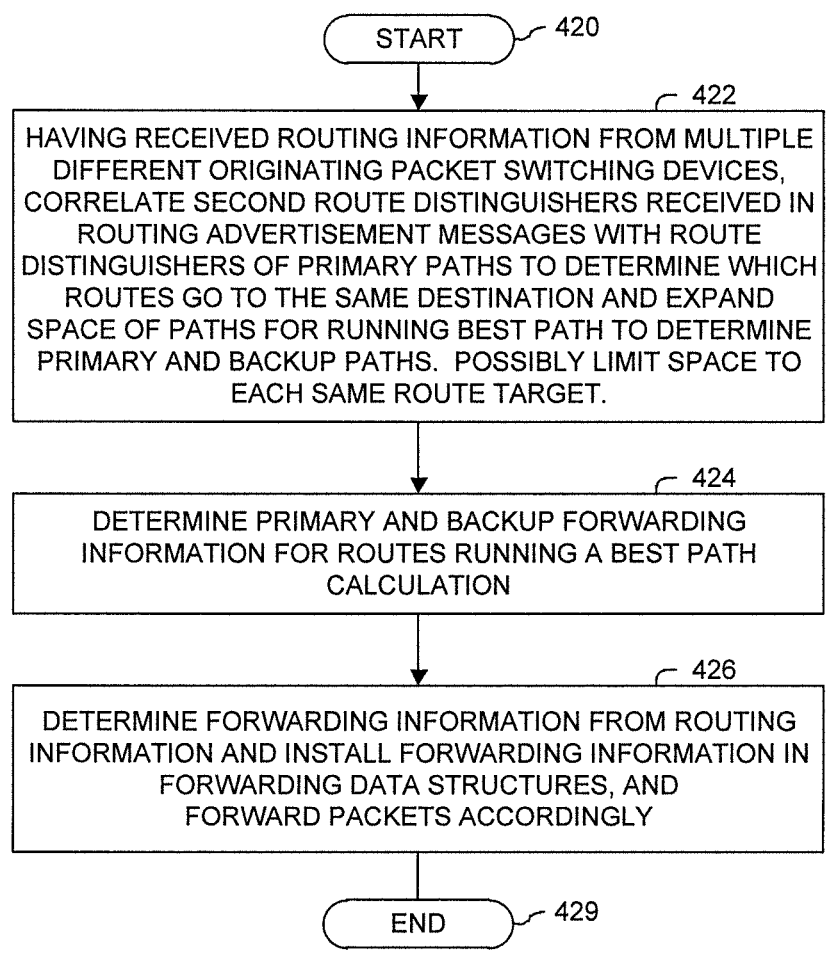
FIG. 4B illustrates a process according to one embodiment.

FIG. 4B illustrates a process performed in one embodiment. In one embodiment, the process of FIG. 4B is included in the process of FIG. 4A of one or more packet switching devices.

Processing of the flow diagram of FIG. 4B begins with process block 420. In process block 422, the packet switching device, having received routing information from multiple different originating packet switching devices, correlates second route distinguishers with route distinguishers of primary paths to determine which routes go to the same destination. Thus, the space of paths to a same destination is expanded for running a best path calculation to determine primary and backup paths to this destination (even though the routes to the same destination might be different as they might have different route distinguishers). In one embodiment, this correlation is performed in the context of same route targets received in routing advertisement messages. In process block 424, the primary and backup forwarding information is determined for routes, typically by performing a best path calculation. In process block 426, forwarding information is determined and installed in forwarding data structures, and packets are forwarded accordingly. Processing of the flow diagram of FIG. 4 is complete as indicated by process block 429.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   receiving, at a particular packet switching device, routing protocol advertisement information advertising a first Network Layer Reachability Information (NLRI) and advertising a second NLRI; wherein said routing protocol advertisement information of the first NLRI includes: the first NLRI, a first primary path and a route distinguisher correlation value, with the first primary path and the route distinguisher correlation value identified as being associated with the first NLRI; and wherein said routing protocol advertisement information of the second NLRI includes: second NLRI, a second primary path and the route distinguisher correlation value, with the second primary path and the route distinguisher correlation value identified as being associated with the second NLRI; wherein the first NLRI includes a distinguisher and a particular prefix, and the second NLRI includes a route distinguisher different than the first route distinguisher and the particular prefix; and
   determining a particular backup path from the particular packet switching device for the first NLRI, which includes considering the first NLRI and second NLRI to refer to the same destination based on both the first NLRI and the second NLRI being associated with the route distinguisher correlation value and including the particular prefix;
   wherein the particular backup path includes the second primary path.

2. The method of claim 1, comprising: installing the particular backup path in a forwarding data structure of the particular packet switching device for use in forwarding packets having a destination address corresponding to the first NLRI in case of an unavailability of a particular primary path, including the first primary path, for the first NLRI.

3. The method of claim 1, comprising: forwarding packets, by the particular packet switching device in response to an unavailability of the particular primary path, having a destination address corresponding to the first NLRI over the particular backup path.

4. The method of claim 1, wherein the particular packet switching device is an autonomous system boundary router (ASBR).

5. The method of claim 4, wherein the particular packet switching device is configured to advertise paths to other ASBR-nodes according to the Inter AS Option B model.

6. The method of claim 1, wherein the route distinguisher correlation value is advertised in an extended Border Gateway Protocol (BGP) community as an attribute to the first NLRI.

7. The method of claim 6, wherein the route distinguisher correlation value is not advertised in an extended Border Gateway Protocol (BGP) community as an attribute to the second NLRI.

8. The method of claim 1, wherein the route distinguisher correlation value is the same value as the route distinguisher of the second NLRI.

9. The method of claim 1, wherein the route distinguisher correlation value identifies a route target associated with the second NLRI.

10. The method of claim 1, wherein the route distinguisher correlation value identifies a Border Gateway Protocol (BGP) Next-hop address associated with the second NLRI.

11. A method, comprising:
receiving, at a particular packet switching device, routing protocol advertisement information including advertising a first Network Layer Reachability Information (NLRI) and advertising a second NLRI, wherein said routing protocol advertisement of the first NLRI includes: the first NLRI, a first primary path and a second route distinguisher, with the first primary path and the second route distinguisher identified as being associated with the first route first NLRI; and wherein said routing protocol advertisement information of the second NLRI includes: the second NLRI and a second primary path, with the second primary path identified as being associated with the second NLRI; wherein the first NLRI includes a first route distinguisher and a particular prefix, and the second NLRI includes the second route distinguisher and the particular prefix; and based on the association of the first NLRI with the second route distinguisher, the second route distinguisher being included in the second NLRI, and the particular prefix being the same in the first NLRI and second NLRI and thus considering the first NLRI and second NLRI to refer to a same destination: determining a particular backup path from the particular packet switching device for the first NLRI, with the particular backup path including the second primary path.

12. The method of claim 11, comprising: installing the particular backup path in a forwarding data structure of the particular packet switching device for use in forwarding packets having a destination address corresponding to the first NLRI in case of an unavailability of a particular primary path, including the first primary path, for the first NLRI.

13. The method of claim 11, comprising: forwarding packets, by the particular packet switching device in response to an unavailability of the particular primary path, having a destination address corresponding to the first NLRI over the particular backup path.

14. The method of claim 11, wherein the particular packet switching device is an autonomous system boundary router (ASBR).

15. The method of claim 14, wherein the particular packet switching device is configured to advertise paths to other ASBR-nodes according to the Inter AS Option B model.

16. The method of claim 11, wherein said routing protocol advertisement information includes a same route target associated with both the first NLRI and the second NLRI; and
wherein said determining the particular backup path is further based on the same route target associated with both the first NLRI and the second NLRI.

17. The method of claim 11, wherein said routing protocol advertisement information of the first NLRI, the first primary path and the second route distinguisher, with the first primary path and the second route distinguisher identified as being associated with the first NLRI is originated by a first packet switching device which deteimined a backup path for the first NLRI, with the backup path being associated with the second NLRI from which the second route distinguisher was extracted and included in said routing protocol advertisement information by the first packet switching device.

18. The method of claim 17, wherein said routing protocol advertisement information of the first NLRI, the first primary path and the second route distinguisher, with the first primary path and the second route distinguisher identified as being associated with the first NLRI, is advertised with the second route distinguisher being carried in an extended Border Gateway Protocol (BGP) community as an attribute to the first NLRI.

19. The method of claim 11, wherein said routing protocol advertisement information of the first NLRI, the first primary path and the second route distinguisher, with the first primary path and the second route distinguisher identified as being associated with the first NLRI, is advertised with the second route distinguisher being carried in an extended Border Gateway Protocol (BGP) community as an attribute to the first NLRI.

20. A particular packet switching device, comprising:
a plurality of interfaces configured to send and receive packets;
memory; and
one or more processing elements;
wherein the particular packet switching device is configured to:
receive routing information, which includes: first routing information advertising a first Network Layer Reachability Information (NLRI) originated by a first packet switching device, and second routing information advertising a second NLRI originated by a second packet switching device; wherein said first routing information includes: the first NLRI associated with a first primary path and a route distinguisher correlation value; wherein said second routing information includes the second NLRI associated with a second primary path and the route distinguisher correlation value; and wherein the first NLRI and the second NLRI both include a same particular prefix but have different route distinguishers;
determine a particular backup path for the first NLRI, which includes considering the first NLRI and second NLRI to refer to a same destination based on both the first NLRI and the second NLRI being associated with the route distinguisher correlation value and having the same particular prefix, and wherein the particular backup path includes the second primary path;
install the particular backup path in a forwarding data structure of the particular packet switching device for use in forwarding packets associated with a destination address of the first NLRI in case of an unavailability of a particular primary path, including the first primary path, for the first NLRI; and
forward particular packets associated with a destination address of the first NLRI over the particular backup path instead of the particular primary path in response to an unavailability of the particular primary path.

21. A particular packet switching device, comprising: a plurality of interfaces configured to send and receive packets; memory; and one or more processing elements; wherein the particular packet switching device is configured to: receive routing information, which includes: first routing information advertising a first Network Layer Reachability Information (NLRI) originated by a first packet switching device, and second routing information advertising a second NLRI originated by a second packet switching device; wherein said first routing information includes: the first NLRI associated with a first primary path and with a second route distinguisher of a backup path for the first NLRI; wherein said second routing information includes the second NLRI associated with a second primary path; and wherein the first NLRI includes a first route distinguisher and a particular prefix, and the second NLRI includes the second route distinguisher and the particular prefix; determine a particular backup path for the first NLRI, which includes considering the first NLRI and second NLRI to refer to a same destination based on the second route distinguisher received in the first routing protocol advertisement being the same as the second route distinguisher of the second NLRI, and wherein the particular backup path includes the second primary path; install the particular backup path in a forwarding data structure of the particular packet switching device for use in forwarding packets associated with a destination address of the first NLRI in case of an unavailability of a particular primary path, including the first primary path, for the first NLRI; and forward particular packets associated with a destination address of the first NLRI over the particular backup path instead of the particular primary path in response to an unavailability of the particular primary path.

22. The method of claim 1, wherein the route distinguisher correlation value identifies the route distinguisher of the second NLRI.

23. The method of claim 1, wherein the route distinguisher correlation value identifies a virtual private network associated with the second NLRI.

24. The method of claim 1, wherein the route distinguisher correlation value is a scalar value that is not a route distinguisher nor a route target nor an identification of a virtual private network nor an identification of a Border Gateway Protocol (BGP) Next-hop address of the first NLRI nor the second NLRI.

* * * * *

UNITED STATES PATENT AND TRADEMARK OFFICE
CERTIFICATE OF CORRECTION

PATENT NO. : 9,124,511 B2
APPLICATION NO. : 13/347653
DATED : September 1, 2015
INVENTOR(S) : Olofsson et al.

Page 1 of 1

It is certified that error appears in the above-identified patent and that said Letters Patent is hereby corrected as shown below:

In the Specification

Col. 9, line 57, "VRF1 configured" should be – VRF1 (configured –

In the Claims

Col. 12, Claim 1, line 12, "includes: second" should be – includes: the second –

Col. 12, Claim 1, line 17, "a distinguisher" should be – a first route distinguisher –

Col. 13, Claim 11, line 10, "the first route first NLRI;" should be – the first NLRI; –

Col. 13, Claim 17, line 6, "deteimined" should be – determined –

Signed and Sealed this
Twenty-eighth Day of June, 2016

Michelle K. Lee
*Director of the United States Patent and Trademark Office*